(12) United States Patent
Choi (10) Patent No.: US 6,845,559 B2
(45) Date of Patent: Jan. 25, 2005

(54) METHOD FOR COUPLING A PROTECTIVE NET TO FLEXIBLE TUBE FOR A SPRINKLER

(75) Inventor: Jin Lim Choi, Kyungki-do (KR)

(73) Assignee: Dong-A Flexible Metal Tubes Co., Ltd., Seoul (KR)

( * ) Notice: Subject to any disclaimer, the term of this patent is extended or adjusted under 35 U.S.C. 154(b) by 0 days.

(21) Appl. No.: 10/175,033

(22) Filed: Jun. 20, 2002

(65) Prior Publication Data

US 2002/0195817 A1 Dec. 26, 2002

(30) Foreign Application Priority Data

Jun. 25, 2001 (KR) .......................................... 2001-36318

(51) Int. Cl.[7] .......................... B21K 21/08; B23K 9/235
(52) U.S. Cl. ............................ 29/890.143; 29/890.141; 138/142; 228/135; 285/288.5
(58) Field of Search .................. 29/890.14, 890.144, 29/890.141, 890.142, 890.143; 138/121, 137, 139, 142, 143, 140; 228/135, 136, 173.1, 173.5, 180.5, 245, 256; 285/288.5, 289.2, 289.5, 289.4

(56) References Cited

U.S. PATENT DOCUMENTS

| | | | | |
|---|---|---|---|---|
| 2,473,879 A | * | 6/1949 | Guarnaschelli | 285/222.5 |
| 3,023,496 A | * | 3/1962 | Humphrey | 228/182 |
| 4,089,351 A | * | 5/1978 | Ward et al. | 138/109 |
| 4,869,420 A | * | 9/1989 | Kessler, Jr. | 228/115 |
| 5,069,253 A | * | 12/1991 | Hadley | 138/109 |
| 5,297,586 A | * | 3/1994 | McIntosh | 138/109 |
| 5,499,439 A | * | 3/1996 | Zaborszki et al. | 29/508 |
| 5,660,419 A | * | 8/1997 | Kim | 138/109 |
| 5,819,807 A | * | 10/1998 | Reed | 138/121 |
| 6,016,842 A | * | 1/2000 | Rooke | 138/109 |

FOREIGN PATENT DOCUMENTS

FR 790455 A1 * 8/1997

OTHER PUBLICATIONS

Chris Kopfer, Vibratory Stress Relief, MMS Online, www.mmsonline.com/articles/0501rt3.html.*

* cited by examiner

Primary Examiner—Marc Jimenez
(74) Attorney, Agent, or Firm—Greenblum & Bernstein P.L.C.

(57) ABSTRACT

A structure and a method for coupling a protective net to a flexible tube, comprising shaping the flexible tube, wrapping the flexible tube with the meshed protective net made of stainless steel, and welding both ends of the flexible tube to both ends of the protective net. A solution heating process for the flexible tube and welding process for the flexible tube and the protective net are simultaneously carried out under the same condition in the same furnace. As a result, the protective net and the flexible tube are uniform in terms of physical properties. Furthermore, intergranular corrosion of stainless steel by inevitable stress generated upon welding a flexible tube and a protective net using any one of conventional methods, and crevice corrosion between a welding ring and a flexible tube, are prevented.

5 Claims, 10 Drawing Sheets

METHOD FOR COUPLING A PROTECTIVE NET TO FLEXIBLE TUBE FOR A SPRINKLER

BACKGROUND OF THE INVENTION

1. Field of the Invention

The present invention relates to a flexible tube to be used in a sprinkler system for fire suppression, which is installed in the ceiling of building, and more particularly, to a structure and a method for coupling a meshed protective net made of stainless steel to a flexible tube, in which when high pressure is applied to the flexible tube used as a high pressure piping in a sprinkler system, expansion and subsequent deformation or bursting of the flexible tube are prevented.

2. Description of the Related Art

Figure 1:
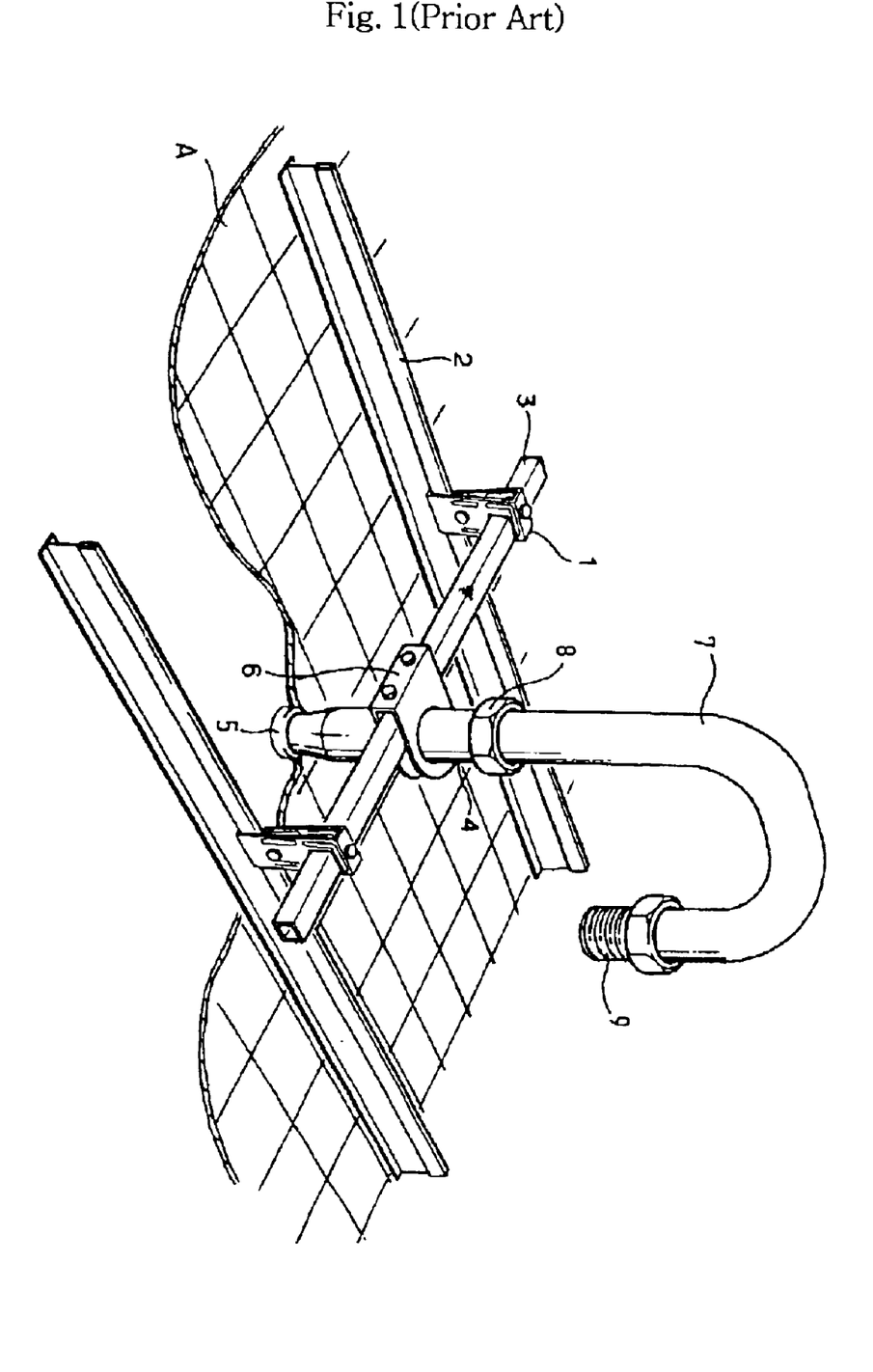
FIG. 1 is a perspective view showing a conventional sprinkler system installed in a building.

Conventionally, a sprinkler system is installed in the ceiling of a building, as shown in FIG. 1. A top panel (A) is attached to the lower side of the sprinkler system. A support member 3 is fixed on a top bar 2 with the aid of a locking member 1. A reducer 4, in the lower end of which a sprinkling head 5 is fitted, is fixed in the support member 3 with the aid of a locking member 6. One end of the reducer 4 is connected to a flexible tube 7 by a method such as welding. The other end of the flexible tube 7 is connected to a main tube (not shown) and a nipple 9, feeding the sprinkling head 5 with extinguishing fluid.

A flexible tube for a sprinkler must be installed not to overlap a heating and cooling duct, a top joist, an electrical communication tube, an electric lamp, and the like, in a small ceiling space. For this purpose, the flexible tube must have a high flexibility not to burst even upon bending several times. In addition, even in the case where high pressure extinguishing fluid of more than 17.5 kg/cm$^2$ is provided, in order for the sprinkling head not to separate from the top panel, a flexible tube, in which the degree of expansion is small, must be used. However, generally, when a flexible tube with crest and valley portions is provided with high pressure extinguishing fluid, it is undesirably expanded to deform or crack, thereby bursting. To prevent these phenomena, flexible tube is conventionally reinforced by coupling a meshed protective net made of steel wire thereto.

Figure 2:
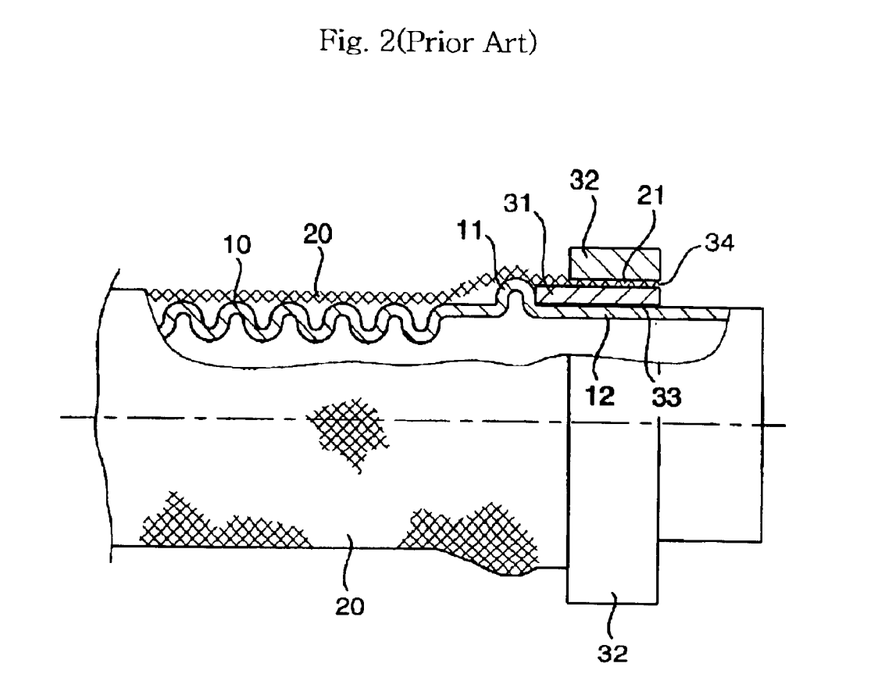
FIGS. 2 and 3 are cross sectional views showing structures for coupling a protective net to a flexible tube for a sprinkler according to the prior art.

A method is reported in which a flexible tube is coupled with a protective net, as shown in FIG. 2. Stopper projections 11 are formed on straight tube portions of both ends of the flexible tube 10 with crest and valley portions. Then, inner locking rings 31 are fitted around the straight tube portions 12 adjacent to both ends of the stopper projections 11. Then, the flexible tube 10 is wrapped with a meshed cylindrical protective net made of steel wire, in a manner such that both ends 21 of the protective net 20 encircle the inner locking rings 31. Then, outer locking rings 32 are fitted thereon. Then, when the outer locking rings 32 so formed are compressed and fastened inwardly, each of ends 21 of the protective net is fastened between the inner and outer locking rings 31, 32, with the result that the protective net 20 is coupled to the flexible tube 10.

However, in the above method, in which the flexible tube 10 and protective net 20 are coupled, potentiometric corrosion and crevice corrosion occur between the flexible tube 10 or protective net 20, each made of austenite stainless steel, and the inner or outer locking rings 31, 32, each made of iron, with the result that fatal defects are created in the flexible tube. Specifically, crevice corrosion and potentiometric corrosion occurring between different metals are found in the gap 33 defined between the inner locking ring 31 and the straight tube portion 12 of the flexible tube. This causes fatal defects such as perforation or cracking in the straight tube portion 12 of the flexible tube in the form of thin plate tube of 0.3 mm–0.4 mm in thickness. Each of ends of the protective net 21 placed in the gaps 34 between the inner and outer locking rings 31, 32, is corroded, whereby the protective net 20 is easily separated from the flexible tube 10.

In addition, in the course of fastening the outer locking ring 32 to the inner locking ring 31 in order to fasten the end 21 of the protective net between the inner and outer locking rings 31, 32, the straight tube portion 12 of the flexible tube is subjected to pressure to be deformed or stressed. The above method for coupling the protective net 20 to the flexible tube 10 involves forming the stopper projections 11 in both ends of the flexible tube, fitting the inner and outer locking rings 31, 32 around the straight tube portions 12, and compressing the outer locking rings 32. As a result, there are problems in that the working process is complicated and the number of parts increases, thereby the unit cost of production is high.

Figure 3:
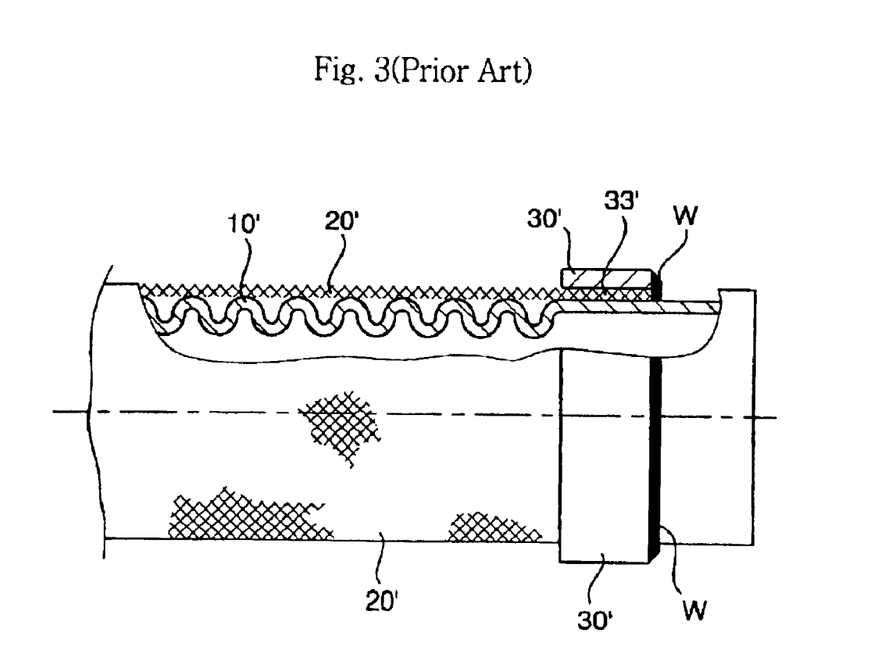

Meanwhile, as shown in FIG. 3, another prior art concerns a method for coupling a protective net to a flexible tube, comprising wrapping a flexible tube 10' with a protective net 20', fitting a weld ring 30' around the end of the protective net 20', and welding the end of the flexible tube 10', the end of the protective net 20', and the end of the weld ring 30'.

In the above method, however, in the course of forming crest and valley portions in the flexible tube 10', stress and work hardening inevitably occur. Generally, in order to remove the stress and work hardening, the flexible tube is solution heated at a temperature of 1,050° C. to 1,150° C., followed by welding. During the welding process, carbides are undesirably precipitated and thus intergranular corrosion occurs in portions heated at a temperature of 450° C. to 850° C., a brittleness temperature of a stainless steel, by welding heat of 1,400° C. to 1,500° C. This may cause fatal defects in thin plate flexible tubes. Furthermore, crevice corrosion occurs in gap 33' defined between the weld ring 30' and the flexible tube 10'. Still furthermore, the weld ring 30' is separately required, and a welding process must be separately carried out after solution heating the flexible tube 10' in order to remove stress generated during shaping the flexible tube 10'. As a result, the production process is complicated and the unit cost of production is high.

SUMMARY OF THE INVENTION

Therefore, the present invention has been made in view of the above problems, and it is an object of the present invention to provide a structure and method for coupling a protective net to a flexible tube for a sprinkler, in which a production process is simplified and the unit cost of production is reduced by carrying out a heating process of the flexible tube simultaneously with a welding process of the flexible tube and the protective net.

It is another object of the present invention to provide a method for coupling a protective net to a flexible tube, by which the flexible tube develops no defects due to corrosion.

It is a further object of the present invention to provide a structure and method for carrying out a solution heating process of a flexible tube for a sprinkler, simultaneously with a welding process of a protective net, a reducer, a nipple and a flexible tube.

It is yet another object of the present invention to provide a structure for coupling a protective net to a flexible tube for a sprinkler, in which welding strength between the flexible tube and the reducer or nipple is high and corrosion resistance is improved.

In accordance with one aspect of the present invention, the above and other objects can be accomplished by the provision of a structure and a method for coupling a protective net to a flexible tube for a sprinkler, comprising wrapping the flexible tube with the meshed cylindrical protective net made of stainless steel wire, and fusing welding material so that the fused welding material is introduced between both ends of the protective net and the straight tube portions, thereby welding both ends of the protective net and the flexible tube.

Another aspect of the present invention is to carry out a heating process for removing residual stress in a flexible tube made of austenite stainless steel by heating the tube in a heating furnace at a temperature of 1,050° C. to 1,150° C., simultaneously with a welding process for coupling a protective net to the flexible tube.

Yet another aspect of the present invention is to carry out simultaneously the above heating process and a welding process for coupling a protective net, a reducer and a nipple to a flexible tube.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention will be described in detail with reference to the accompanying figures.

Figure 4A:
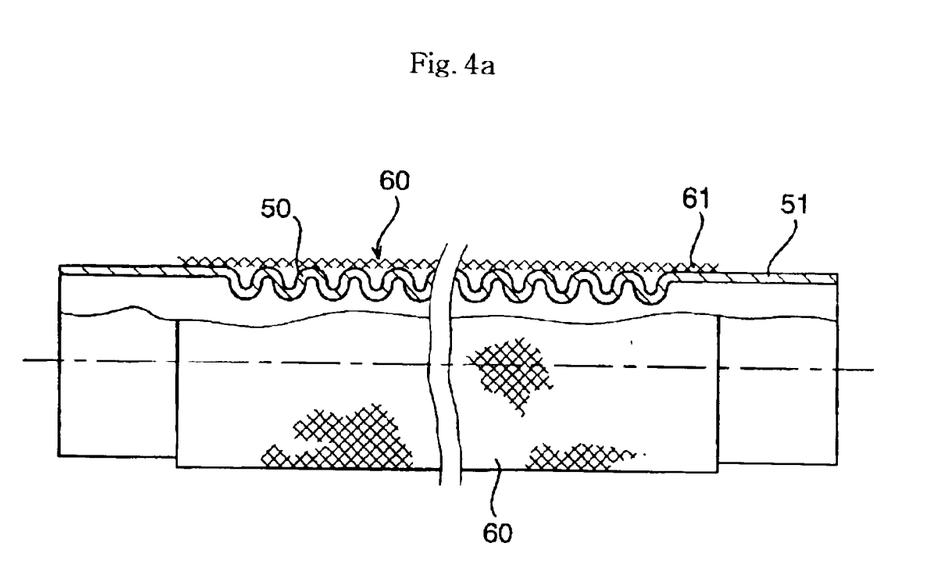
FIGS. 4a to 4e are partial cross sectional views of a structure and method for coupling a protective net to a flexible tube according to one embodiment of the present invention.
Figure 4B:
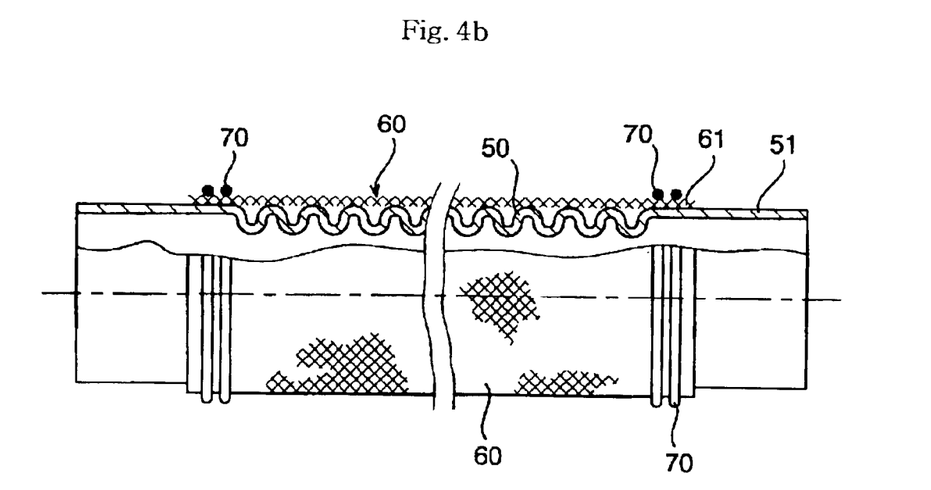
Figure 4C:
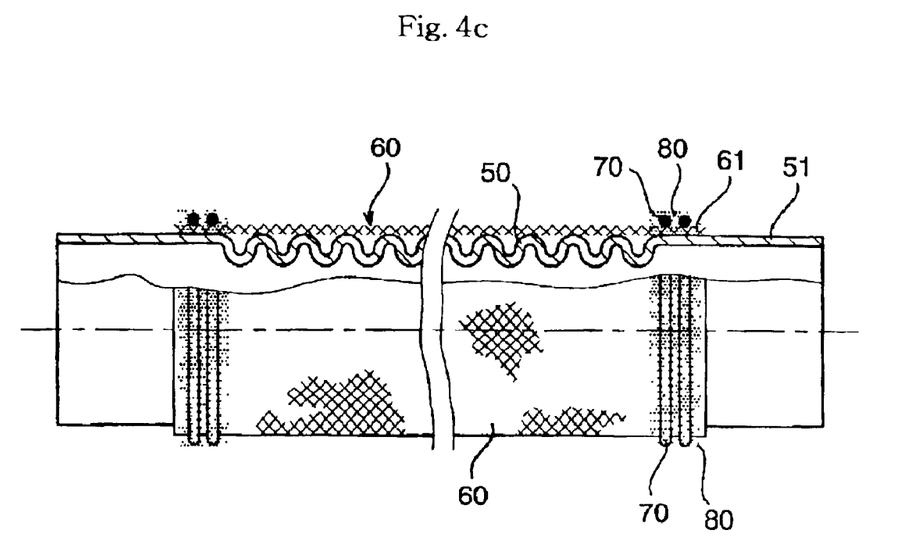
Figure 4D:
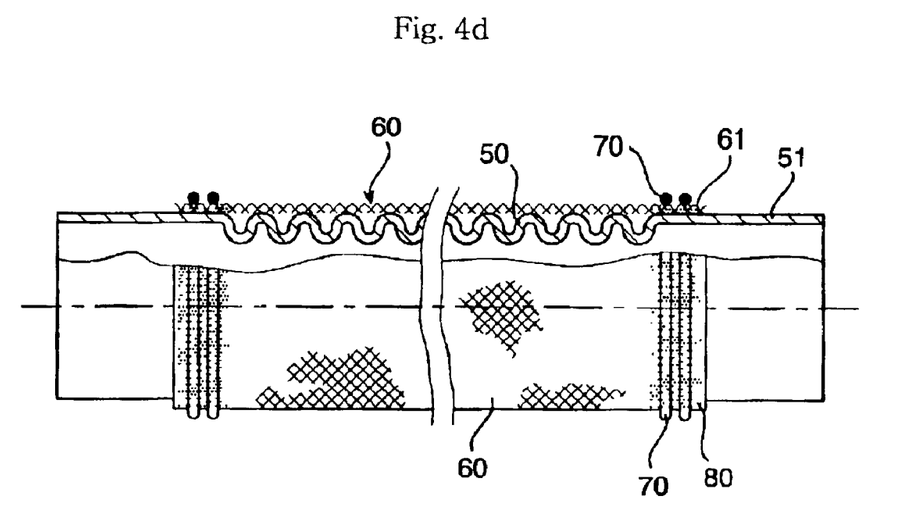
Figure 4E:
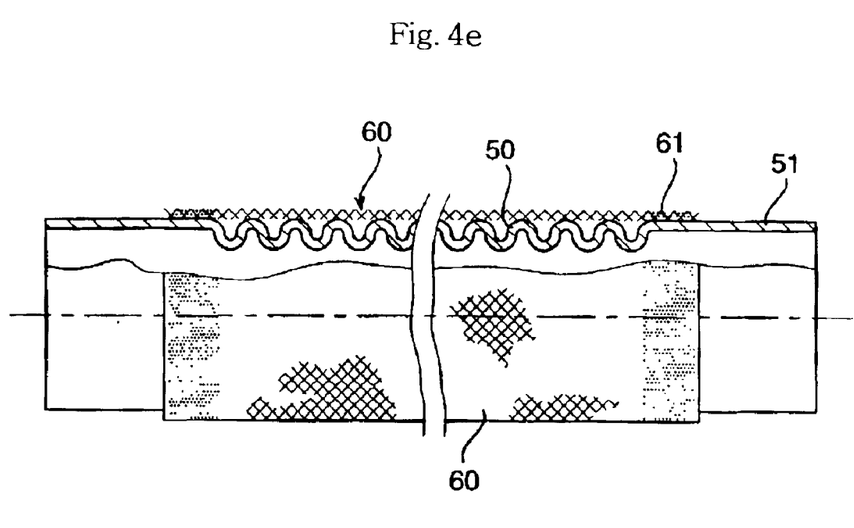

In accordance with one embodiment of the present invention, as shown in FIGS. 4a to 4e, a method for coupling a protective net to a flexible tube for a sprinkler comprises the following steps:

wrapping a flexible tube 50 made of austenite stainless steel with a meshed cylindrical protective net 60 made of stainless steel wire, in a manner such that parts of straight tube portions 51 of both ends of the flexible tube are wrapped with both ends 61 of the protective net (first step, FIG. 4a);

winding both ends 61 of the protective net with stainless steel wire 70 of a larger diameter than the protective net, so as to fix temporarily both ends 61 of the protective net to the straight tube portions 51 (second step, FIG. 4b);

applying brazing material 80 to both ends of the protective net (third step, FIG. 4c);

fusing the brazing material 80 so that the fused brazing material is introduced between both ends 61 of the protective net and the straight tube portions 51, followed by cooling, thereby welding the flexible tube 50 and protective net 60, while solution heating the third step resultant in a heating furnace at a temperature of 1,050° C. to 1,150° C. so as to remove stress and work hardening generated upon shaping the flexible tube (fourth step, FIG. 4d); and unwinding and removing the steel wires 70 from both ends of the protective net (fifth step, FIG. 4e).

The flexible tube 50 is preferably made of AISI 304 or AISI 316L, belonging to austenite stainless steels. The AISI 304 is composed of less than 0.08% of C, 0.5 to 0.75% of Si, less than 0.035% of P, 8.00 to 15.00% of Ni, and 17.00 to 18.00% of Cr. The AISI 316L is composed of less than 0.03% of C, 0.5 to 0.75% of Si, less than 0.035% of P, less than 0.03% of S, 12.00 to 15.00% of Ni, 17.00 to 18.00% of Cr, and 2.00 to 3.00% of Mo. In the AISI 304 and AISI 316L, the temperature for solution heating to remove stress ranges from 1,050° C. to 1,150° C. Therefore, the brazing materials to be used in the third step comprise Ag-Mn type with a welding temperature of 970° C. to 1,150° C., Ag-Cu type with a welding temperature of 990° C. to 1,090° C., and Ni-Cr type with a brazing temperature of 1,090° C. to 1,180° C. In particular, BNi Cr type welding material is preferable, which is composed of 65 to 75% Ni, 13 to 20% Cr, 2.75 to 4.75% B and trace Fe, Si and C. This is because welding temperature thereof is 1,090° C. to 1,180° C., similar to the solution heating temperature of the flexible tube.

The heating temperature in the fourth step ranges preferably from 1,050° C. to 1,150° C.

In accordance with a second embodiment of the present invention, a method for coupling a protective net to a flexible tube is shown in FIGS. 5a to 5d.

Figure 5A:
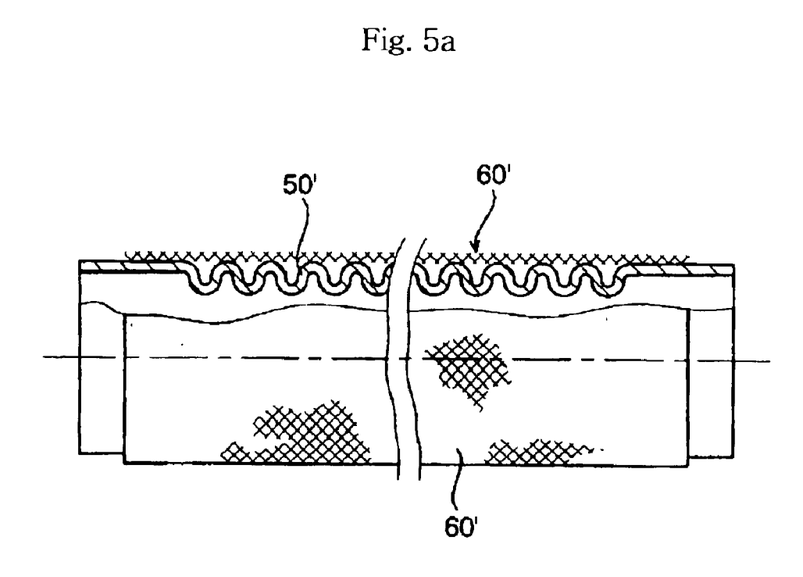
FIGS. 5a to 5d are partial cross sectional views of a structure and method for coupling a protective net to a flexible tube according to another embodiment of the present invention.
Figure 5B:
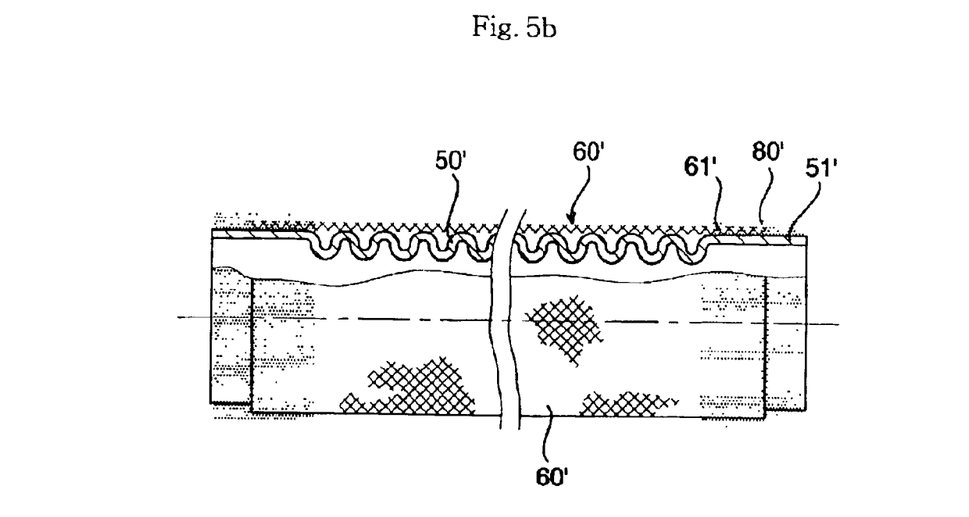
Figure 5C:
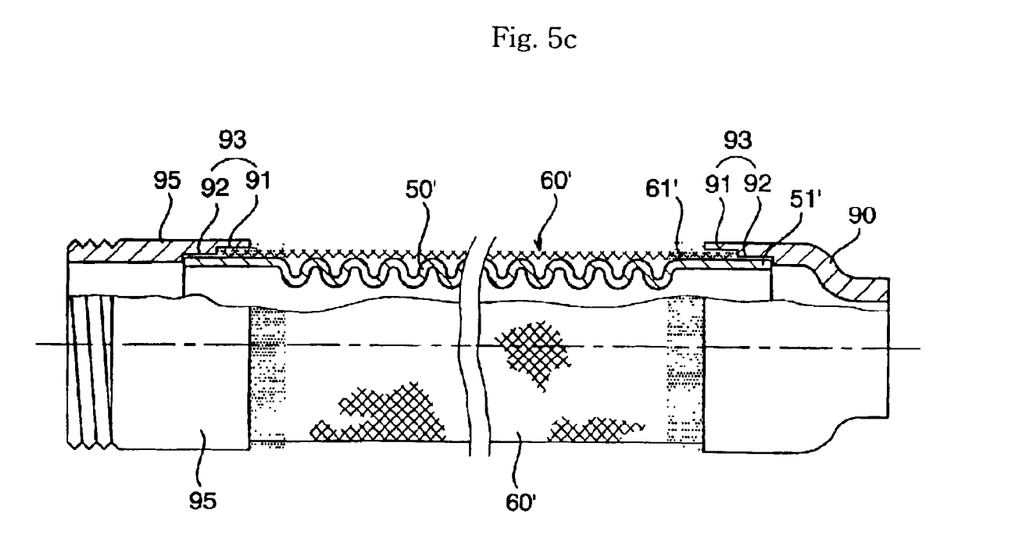
Figure 5D:
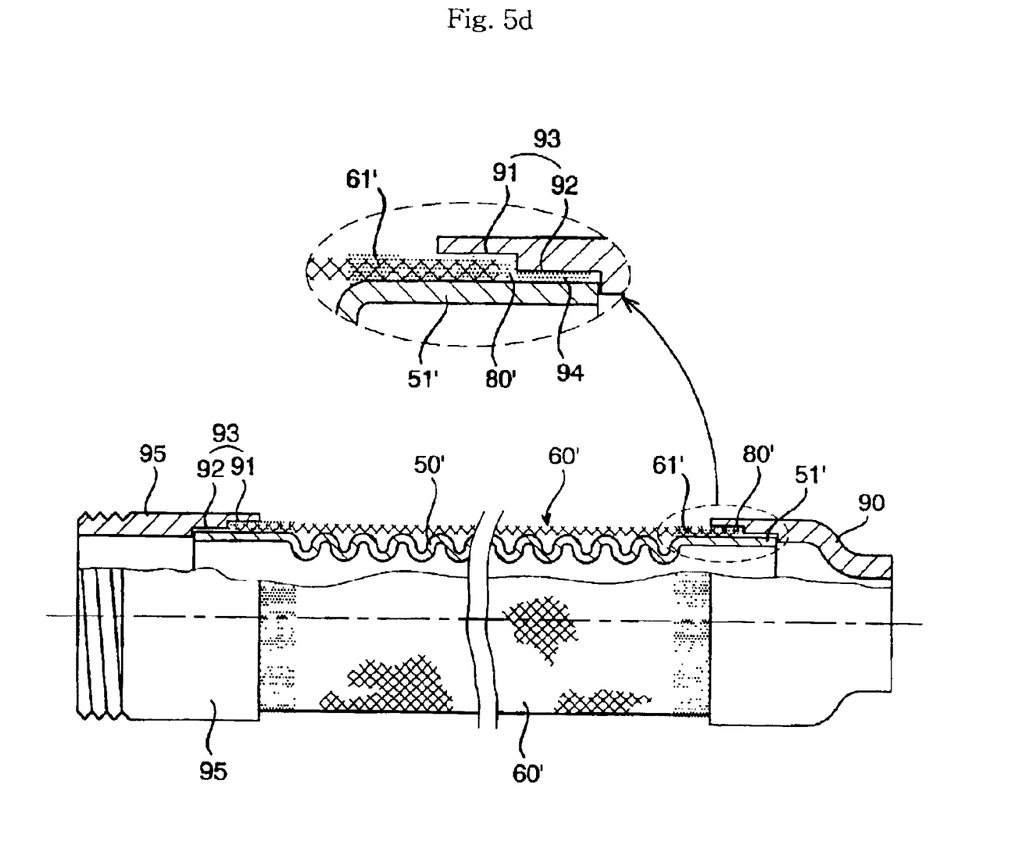

The second embodiment shown in FIGS. 5a to 5d concerns a method for coupling a protective net as well as a reducer and a nipple to a flexible tube. The method comprises the following steps:

wrapping a flexible tube 50' made of austenite stainless steel with a meshed cylindrical protective net 60' made of stainless steel (first step, FIG. 5a);

applying brazing material 80', to both ends 61'of the protective net wrapping parts of straight tube portions 51'of both ends of the flexible tube 50', and to remaining straight tube portions 51' not wrapped with the protective net (second step, FIG. 5b);

fitting one end of each of a reducer 90 and a nipple 95 around each of the not wrapped straight tube portions 51'(third step, FIG. 5c); and fusing the brazing material 80' so that the fused brazing material is introduced into the gap 94 defined between the straight tube portion 51' and the end of the reducer 90 (nipple 95), and into the end 61' of the protective net fitted between the straight tube portion 51' and the end 93 of the reducer 90 (nipple 95), thereby welding the flexible tube 50', the protective net 60', the reducer 90 and the nipple 95, while solution heating the flexible tube produced through the above steps in a heating furnace so as to remove stress and work hardening generated upon shaping the flexible tube 50' (fourth step, FIG. 5*d*).

One side of the flexible tube 50' is connected with the reducer 90, in the end of which a sprinkling head is fitted (not shown). The other side of the flexible tube 50' is connected with the nipple 95, which is in turn connected to a main tube (not shown), whereby extinguishing fluid is fed to the sprinkling head via the flexible tube 50'.

Meanwhile, referring to FIG. 5*d*, each of the nipple 95 and the reducer 90 is formed, at an end thereof, with a first large inner diameter portion 92 and a second large inner diameter portion 91. Here, the second large inner diameter portion 91 has a larger inner diameter than the first large inner diameter portion 92. Part of the end 61' of the protective net is fitted into a first gap defined between the second large inner diameter portion 91 and the straight tube portion 51'. Further, a brazing material can smoothly flow through the first gap into a second gap 94 defined between the first large inner diameter portion and the straight tube portion. As a result, the straight tube portion 51' of the flexible tube 50' and the end 61' of the protective net are rigidly welded to each of the reducer 90 and the nipple 95 with the first and second gaps fully filled with the brazing material.

The method for coupling a protective net to a flexible tube according to third embodiment of the present invention is shown in FIGS. 6*a* to 6*e*.

The third embodiment shown in FIGS. 6*a* to 6*e* concerns a method for firmly welding a protective net and a reducer to a flexible tube, simultaneously with coupling a nipple to the flexible tube with a nut.

Figure 6A:
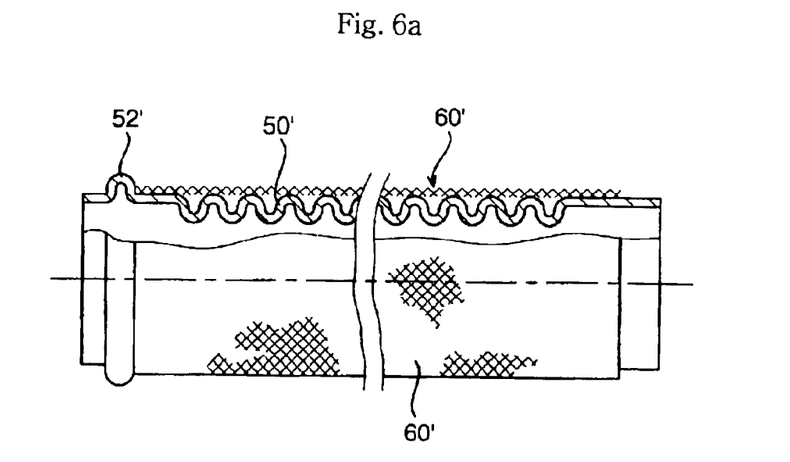
FIGS. 6a to 6e are partial cross sectional views of a structure and method for coupling a protective net to a flexible tube according to still another embodiment of the present invention.
Figure 6B:
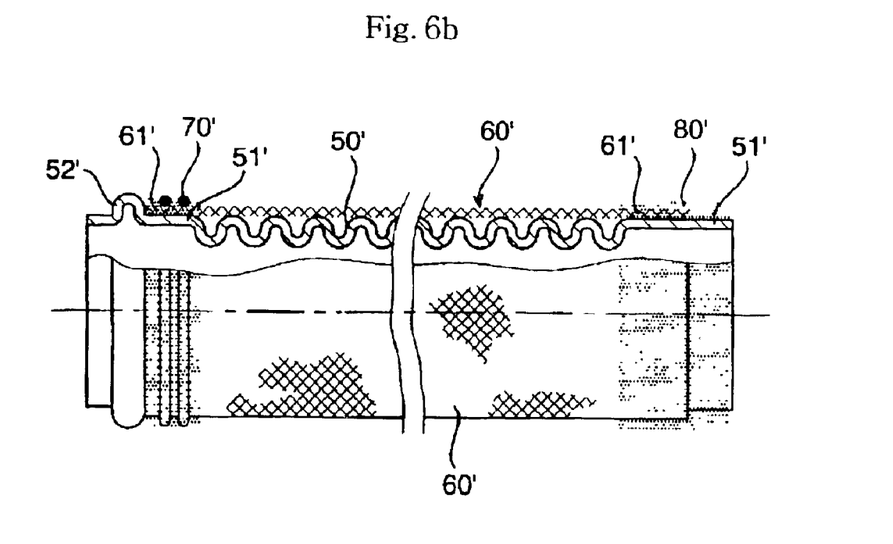
Figure 6C:
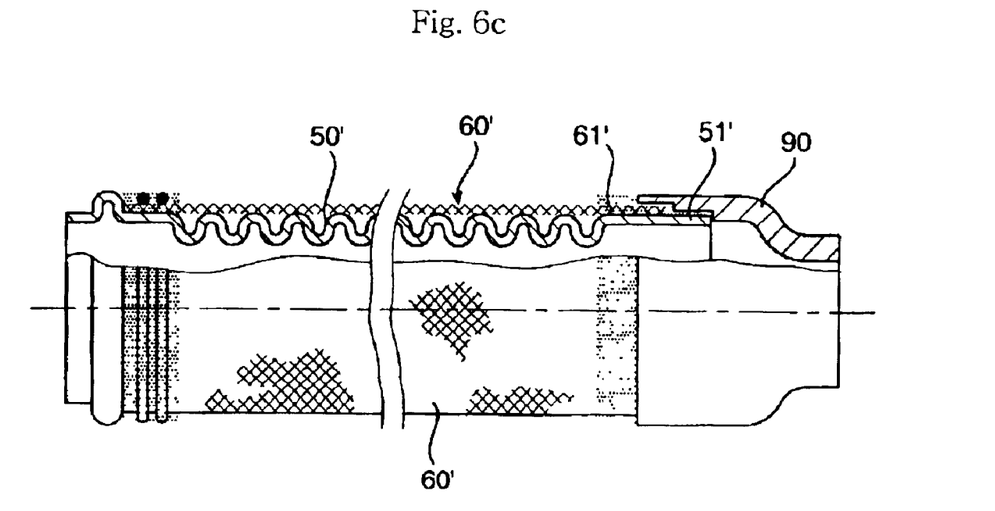
Figure 6D:
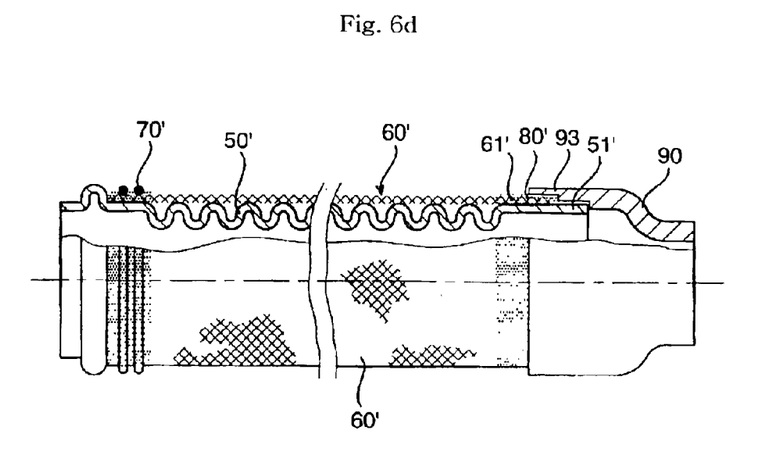
Figure 6E:
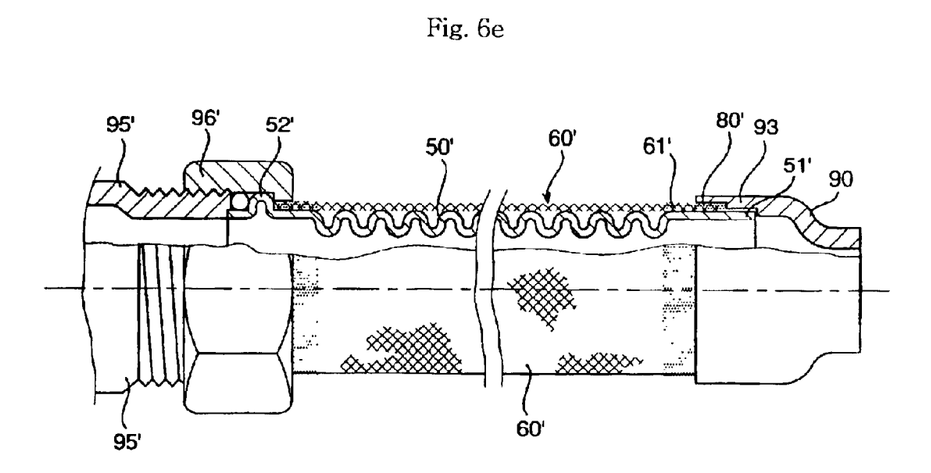

The method comprises the following steps:

wrapping a flexible tube 50', in one end of which a stopper projection 52' is formed, with a cylindrical protective net 60'(first step, FIG. 6*a*);

applying brazing material 80' to both ends 61' of the protective net wrapping parts of straight tube portions 51' of both ends of the flexible tube 50', and to remaining straight tube portions 51' not wrapped with the protective net, and winding the end 61' of the protective net wrapping the one straight tube portion 51' adjacent to the stopper projection 52', with steel wire 70' of larger diameter than the protective net (second step, FIG. 6*b*);

fitting the end of a reducer 90 around the opposite straight tube portion 51'(third step, FIG. 6*c*);

fusing the brazing material 80' so that the fused brazing material is introduced among the straight tube portion 51', the end 61' of the protective net and the end of the reducer 90 thereby welding the flexible tube 50', the protective net 60', and the reducer 90, while solution heating the flexible tube produced through the above steps in a heating furnace (fourth step, FIG. 6*d*); and unwinding and removing the steel wire 70' from the protective net, abutting the nipple 95' and flexible tube 50' with each other, and then threadedly coupling the nut 96' fitted around the flexible tube 50' to the externally threaded portion of one end of the nipple 95', so as to connect the flexible tube 50'and the nipple 95' with each other (fifth step, FIG. 6*e*).

Although not shown in FIGS. 6*a* to 6*e*, the reducer can be connected through a fastening nut and the nipple can be connected through welding, to the flexible tube.

Meanwhile, a complete structure of the flexible tube coupled to the protective net, the nipple and the reducer is as shown in the above FIG. 5*d*. The flexible tube 50' with crest and valley portions is wrapped with the meshed cylindrical protective net 60' made of steel wire, in a manner such that parts of the straight tube portions 51' of both ends of the flexible tube are wrapped with both ends 61' of the protective net. Welding material is introduced between both ends 61' of the protective net and the straight tube portions 51' of the flexible tube, whereby each of ends 61' of the protective net is directly welded to each of the straight tube portions 51' of the flexible tube with being fitted in the second large inner diameter portion 91 of each of the reducer and nipple. As the same time, each of the straight tube portion 51' not wrapped with the protective net 60' is welded to the first large inner diameter portion 92 of each of the reducer 90 and the nipple 95 with being fitted in the first large inner diameter portion 92.

Figure 7:
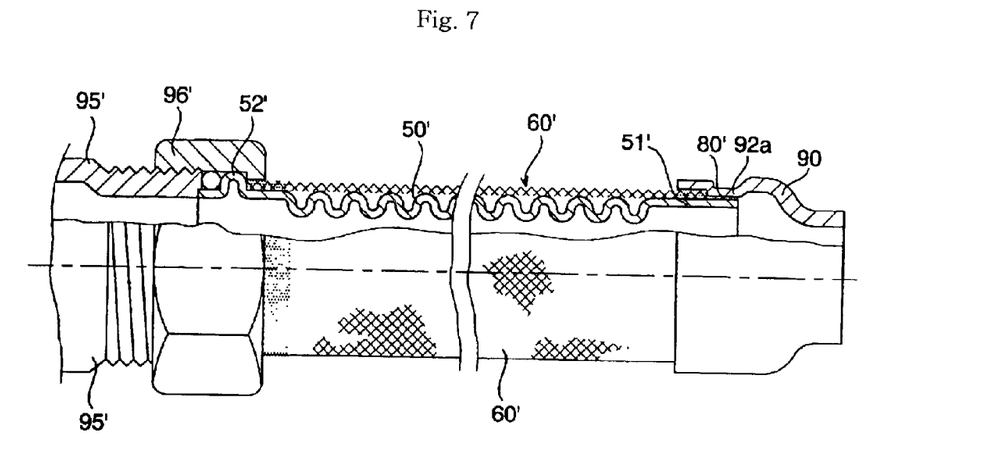
FIGS. 7 and 8 are partial cross sectional views of structures for coupling a protective net to a flexible tube according to yet another embodiment of the present invention.
Figure 8:
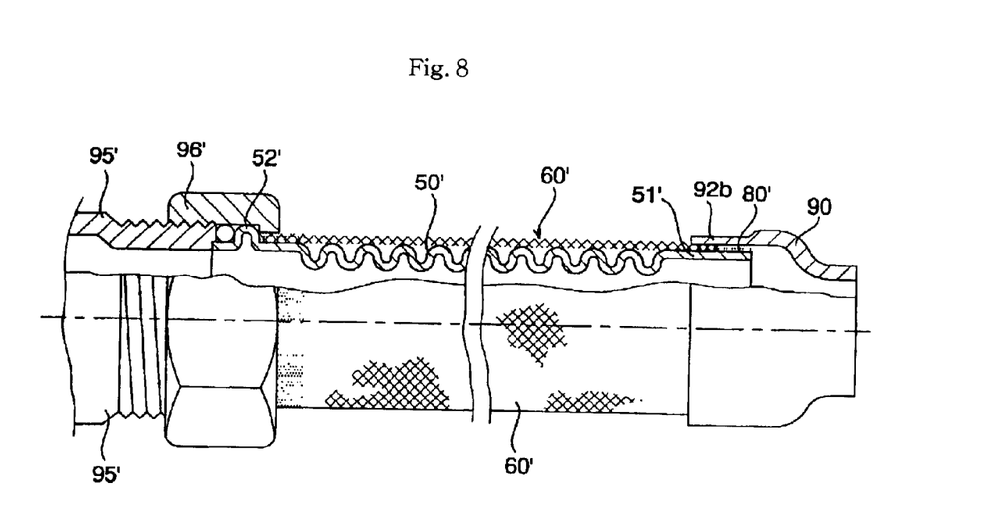

Meanwhile, it is preferable that the thickness of each of the first large inner diameter portions 92*a*, 92*b* is the same as that of the straight tube portion 51', so that welding portions are heated at a uniform temperature, as shown in FIGS. 7 and 8, respectively. As a result, brazing material 80' introduced between each of the first large inner diameter portions 92*a*,92*b* and the straight tube 51', is promptly and evenly welded, thereby increasing welding strength of the reducer 90' and the straight tube portion 51'.

As apparent from the above description, the present invention provides a structure and method for coupling a protective net to a flexible tube, comprising shaping the flexible tube, wrapping the flexible tube with the meshed protective net made of stainless steel wire, and welding both ends of the flexible tube to both ends of the protective net. The solution heating process for the flexible tube and the welding process for the flexible tube and the protective net are simultaneously carried out under the same condition. As a result, the protective net and the flexible tube are uniform in terms of physical properties. Furthermore, intergranular corrosion of stainless steel by inevitable stress generated upon welding a flexible tube and a protective net using any one of conventional methods, and crevice corrosion between a weld ring and a flexible tube, are prevented. In case of using a method comprising wrapping the flexible tube with the meshed protective net made of stainless steel wire, applying welding material to welding portions, and solution heating the resultant flexible tube, the heating process and welding process are simultaneously carried out in the same furnace. As a result, the number of required parts and materials is reduced, and the unit cost of production is curtailed due to omitting of a separate welding process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for coupling a protective net to a flexible tube for a sprinkler, comprising:

wrapping a flexible tube having crest and valley portions with a meshed cylindrical protective net made of stainless steel wire, in a manner such that inward parts of straight tube portions of both ends of the flexible tube are wrapped with both ends of the protective net;

winding both ends of the protective net with stainless steel wire of larger diameter than the wire of the protective net, so as to fix temporarily both ends of the protective net to the inward parts of the straight tube portions;

applying welding material to both ends of the protective net;

fusing the welding material so that the fused welding material is introduced between both ends of the protective net and the inward parts of the straight tube portions, thereby welding the flexible tube and the protective net, while solution heating the flexible tube so as to remove stress and work hardening; and unwinding and removing the steel wire from both ends of the protective net.

2. The method as set forth in claim 1, wherein the flexible tube is made of austenite stainless steel, and the welding material is Ag-Mn type, Ag-Cu type, or Ni-Cr type brazing material.

3. The method as set forth in claim 2, wherein the brazing material is BNiCr type brazing material.

4. The method as set forth in claim 1, wherein the temperature for heating and welding is 1,050° C. to 1,150° C.

5. A method for coupling a protective net to a flexible tube for a sprinkler, comprising:

wrapping a flexible tube having crest and valley portions with a meshed cylindrical protective net made of stainless steel wire, in a manner such that inward parts of straight tube portions of both ends of the flexible tube are wrapped with both ends of the protective net;

applying welding material to both ends of the protective net; and fusing the welding material so that the fused welding material is introduced between both ends of the protective net and the inward parts of the straight tube portions, thereby welding the flexible tube and the protective net, while solution heating the flexible tube so as to remove stress and work hardening, wherein the welding material is applied to both ends of the protective net and outward parts of the straight tube portions not wrapped with both ends of the protective net, and then an end of a reducer or a nipple is fitted in the straight tube portions, the reducer or the nipple is welded to the straight tube portions of the flexible tube while heating the flexible tube; and wherein the reducer or the nipple is formed, at one end thereof, with a first large inner diameter portion and a second large inner diameter portion having the inner diameter larger than the inner diameter of the first large inner diameter portion, the end of the protective net is welded to the flexible tube while being fitted in the second large inner diameter portion, and the outward part of the straight tube portion not wrapped with the end of the protective net is fitted in the first large inner diameter portion.

* * * * *